US012645608B1

(12) United States Patent
Savu

(10) Patent No.: US 12,645,608 B1
(45) Date of Patent: Jun. 2, 2026

(54) IN-MEMORY TEMPORARY TABLES FOR LOW LATENCY ANALYSIS

(71) Applicant: People Center, Inc., San Francisco, CA (US)

(72) Inventor: Andrei Savu, Menlo Park, CA (US)

(73) Assignee: People Center, Inc.

( * ) Notice: Subject to any disclaimer, the term of this patent is extended or adjusted under 35 U.S.C. 154(b) by 0 days.

(21) Appl. No.: 19/201,321

(22) Filed: May 7, 2025

(51) Int. Cl.
*G06F 12/123* (2016.01)
*G06F 12/0811* (2016.01)
*G06F 16/2455* (2019.01)

(52) U.S. Cl.
CPC ........ *G06F 12/123* (2013.01); *G06F 12/0811* (2013.01); *G06F 16/24552* (2019.01)

(58) Field of Classification Search
None
See application file for complete search history.

(56) References Cited

U.S. PATENT DOCUMENTS

| | | | | |
|---|---|---|---|---|
| 11,379,268 B1* | 7/2022 | Gupta | .................. | G06F 18/214 |
| 2015/0032684 A1* | 1/2015 | Gupta | .................... | G06F 16/27 |
| | | | | 707/600 |
| 2016/0321083 A1* | 11/2016 | Costa | .................. | G06F 12/0284 |
| 2017/0147575 A1* | 5/2017 | Pappu | ................. | G06F 16/9537 |
| 2019/0179972 A1* | 6/2019 | Mavinakuli | ........... | G06F 16/248 |
| 2019/0332387 A1* | 10/2019 | Bumbulis | ........... | G06F 9/30021 |
| 2021/0081451 A1* | 3/2021 | Wong | ................ | G06F 16/90335 |

* cited by examiner

*Primary Examiner* — Kaushikkumar M Patel
(74) *Attorney, Agent, or Firm* — Dority & Manning, P.A.

(57) ABSTRACT

Systems and methods for returning query results are described herein. The computing system can include ephemeral memory. The computing system can receive a user query identifying first data and identify whether the first data is stored in ephemeral memory or the external in-memory data store. If the first data is stored in the ephemeral memory, the computing system can return the first data from the ephemeral memory. If the first data is stored in the external in-memory data store, the computing system can transmit a request to the external in-memory data identifying the first data using a data block identifier associated with the data. The computing system can then receive the data from the external in-memory data store, return the data as the query result, and cache the data in the ephemeral memory with a time-to-live value.

20 Claims, 6 Drawing Sheets

IN-MEMORY TEMPORARY TABLES FOR LOW LATENCY ANALYSIS

FIELD

The present disclosure generally relates to data management in a database system. More particularly, the present disclosure relates to leveraging temporarily-stored tables backed by an external memory storage system to enable low-latency data analytics and reporting.

BACKGROUND

Many analytics software products produce interactive data summaries and provide interactive reporting for a variety of applications, such as customer relationship management software, inventory software, human resources software, and the like. Traditional data workflows and on-demand queries against large datasets can struggle to achieve low latency (e.g., processing and return) times for returning data in user-facing applications. High latency returns on these data workflows degrade the user experience and the increased time for processing consumes more computing resources (bandwidth, processing cycles, etc.).

These limitations in existing workflows are amplified when working with extremely large datasets, such as data lakes, or when using online transaction processing ("OLTP") systems that require frequent, repeated queries over a computing network to constantly changing data. Furthermore, systems with interactive use cases, such as dynamic reporting or real-time reporting, that require repeated queries, pagination of databases, and complex filtering criteria for data can suffer performance losses and high latency. An example of this type of behavior can be a user viewing a reporting dashboard and making frequent, repeated calls to a data storage by changing filter criteria on the reporting dashboard. Each changing of the criteria requires a new call to stored data to find data that fits the criteria. In one example, the user can be viewing sales data by month, and may be changing the month to view month-over-month sales numbers. Each changing of the month generates a new call to populate the reporting dashboard with new data.

Other issues are present in existing solutions. For example, for many analytics software products, data reporting teams must often manually create staging tables for data access or may be required to perform custom or manual caching of data to speed up often-repeated queries. These solutions are ad-hoc in nature, require manual setup and cleanup, and are not standardized across products. Furthermore, many existing solutions do natively support data eviction policies, which render these existing solutions unsuitable for short-term data caching, as the lack of data eviction policies can lead to stale data or storage bloat if cached data tables remain past their usefulness.

SUMMARY

Aspects and advantages of embodiments of the present disclosure will be set forth in part in the following description, or can be learned from the description, or can be learned through practice of the embodiments.

One example aspect is directed to a computing system. The computing system can include one or more processors and a local memory. The local memory can include an ephemeral memory portion and instructions that, when executed by the one or more processors, cause the one or more processors to perform operations. The operations can include receiving a user query, the user query identifying first data as a query result and identifying whether the first data is stored in ephemeral memory portion of the local memory or an external in-memory data store. If the first data is stored in the ephemeral memory portion of the local memory, the computing system can return the first data from the ephemeral memory portion of the local memory as the query result. If the first data is stored in the external in-memory data store, the computing system can transmit a request to the external in-memory data store, the request identifying the first data in the external in-memory data store using a data block identifier associated with the first data. The computing system can then receive the first data from the external in-memory data store, return the first data as the query result, and cache the first data in the ephemeral memory portion of the local memory with a time-to-live value.

In some implementations, the time-to-live value can be an expiration value defining a time period. The first data can be removed from the ephemeral memory portion of the local memory upon the time period elapsing.

In some implementations, the time-to-live value can be an eviction value defining at least one eviction rule for the first data. The first data can be removed from the ephemeral memory portion of the local memory upon one or more criteria for the eviction rule being met.

In some implementations, the one or more criteria for the eviction rule comprises a least-recently used data criteria.

In some implementations, the one or more criteria for the eviction rule can include a memory constraint criteria.

In some implementations, the external in-data memory store can store data tables as a collection of data blocks. The data block identifier associated with the first data cached in the ephemeral memory portion of the local memory can be a unique key mapping to a data block of the collection of data blocks stored in the external in-data memory store.

In some implementations, caching the first data in the ephemeral memory portion can also include identifying, based on one or more metadata values associated with data stored in the external in-memory data store, one or more data blocks to cache in the ephemeral memory portion of the local memory and caching the identified one or more blocks in the ephemeral memory portion of the local memory with a time-to-live value.

Another example aspect is directed to a computer-implemented method. The computer-implemented method can include receiving, by one or more processors of a computing system, a user query, the user query identifying first data as a query result and identifying, by the one or more processors, whether the first data is stored in an ephemeral memory portion of a local memory of the computing system or an external in-memory data store. If the data to be if the first data is stored in the ephemeral memory portion of the local memory, the computer-implemented method can include returning, by the one or more processors, the first data from the ephemeral memory portion of the local memory as the query result. If the first data is stored in the external in-memory data store, the computer-implemented method can include transmitting, by the one or more processors, a request to the external in-memory data store, the request identifying the first data in the external in-memory data store using a data block identifier associated with the first data, receiving, by the one or more processors, the first data from the external in-memory data store. The computer-implemented method can also include returning, by the one or more processors, the first data as the query result and

3 caching, by the one or more processors, the first data in the ephemeral memory portion of the local memory with a time-to-live value.

In some implementations, the time-to-live value can be an expiration value defining a time period. The first data can be removed from the ephemeral memory portion of the local memory upon the time period elapsing.

In some implementations, the time-to-live value can be an eviction value defining at least one eviction rule for the first data. The first data can be removed from the ephemeral memory portion of the local memory upon one or more criteria for the eviction rule being met.

In some implementations, the one or more criteria for the eviction rule can include a least-recently used data criteria.

In some implementations, the one or more criteria for the eviction rule can include a memory constraint criteria.

In some implementations, the external in-data memory store can store data tables as a collection of data blocks. The data block identifier associated with the first data cached in the ephemeral memory portion of the local memory can be a unique key mapping to a data block of the collection of data blocks stored in the external in-data memory store.

In some implementations, caching the first data in the ephemeral memory portion can include identifying, by the one or more processors and based on one or more metadata values associated with data stored in the external in-memory data store, one or more data blocks to cache in the ephemeral memory portion of the local memory and caching, by the one or more processors, the identified one or more blocks in the ephemeral memory portion of the local memory with a time-to-live value.

Yet another example aspect is directed to a non-transitory, computer-readable medium that can include an ephemeral memory portion of a local memory and instructions that, when executed by one or more processors, cause the one or more processors to perform operations. The operations can include receiving a user query, the user query identifying first data as a query result and identifying whether the first data is stored in ephemeral memory portion of the local memory or an external in-memory data store. If the first data is stored in the ephemeral memory portion of the local memory, the operations can include returning the first data from the ephemeral memory portion of the local memory as the query result. If the first data is stored in the external in-memory data store, the operations can include transmitting a request to the external in-memory data store, the request identifying the first data in the external in-memory data store using a data block identifier associated with the first data and receiving the first data from the external in-memory data store. The operations can also include returning the first data as the query result and caching the first data in the ephemeral memory portion of the local memory with a time-to-live value In some implementations, the time-to-live value can be an expiration value defining a time period. The first data can be removed from the ephemeral memory portion of the local memory upon the time period elapsing.

In some implementations, the time-to-live value can an eviction value defining at least one eviction rule for the first data. The first data can be removed from the ephemeral memory portion of the local memory upon one or more criteria for the eviction rule being met.

In some implementations, the one or more criteria for the eviction rule can include a least-recently used data criteria.

In some implementations, the one or more criteria for the eviction rule can include a memory constraint criteria.

In some implementations, the external in-data memory store can store data tables as a collection of data blocks. The data block identifier associated with the first data cached in the ephemeral memory portion of the local memory can be a unique key mapping to a data block of the collection of data blocks stored in the external in-data memory store.

Other aspects of the present disclosure are directed to various systems, apparatuses, non-transitory computer-readable media, user interfaces, and devices for providing multilayered generation and processing of computer instructions. These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
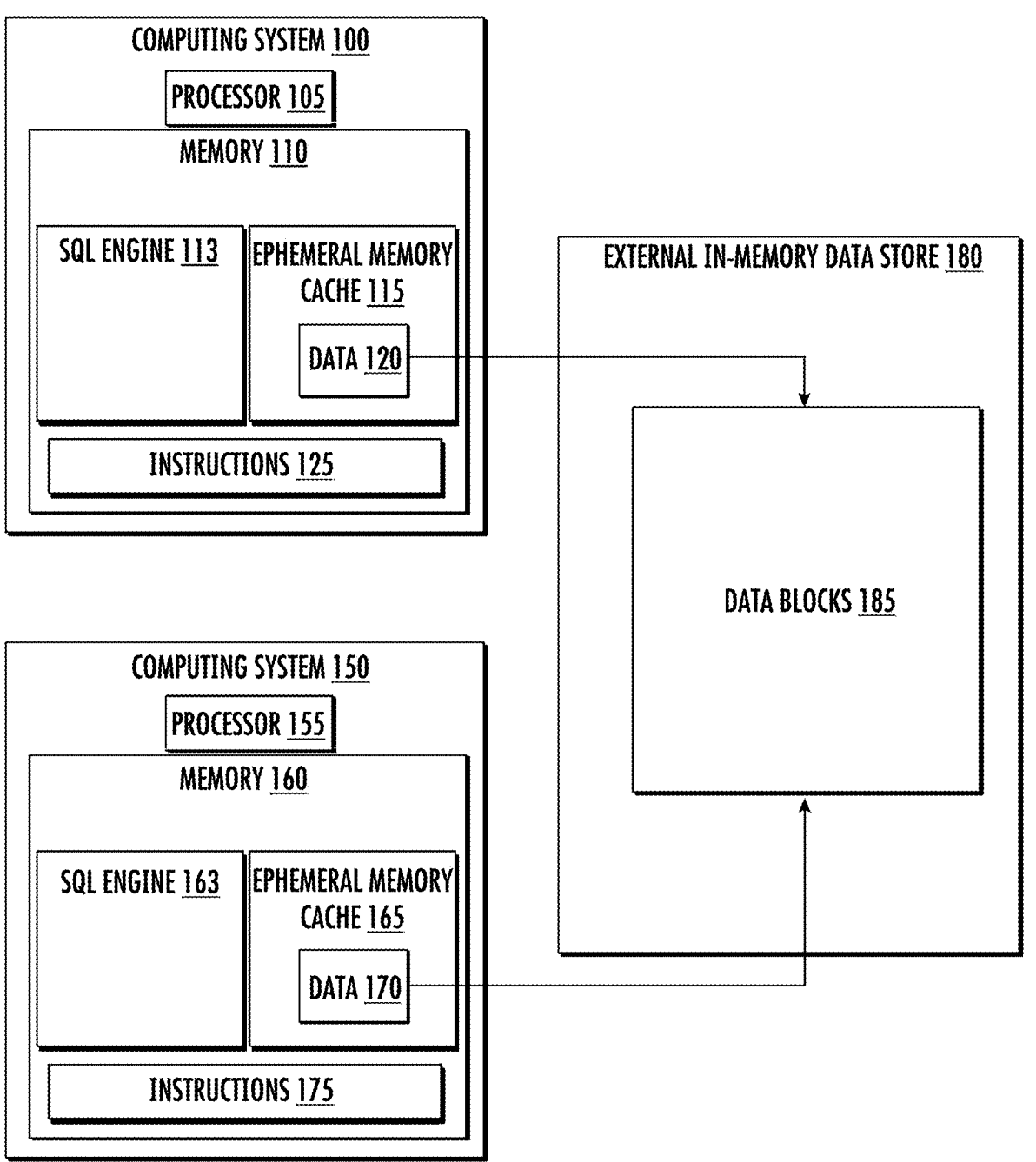
FIG. 1 is a block diagram illustrating a computing system for returning data in response to a user query according to one aspect of the present invention.

Reference numerals that are repeated across plural figures are intended to identify the same features in various implementations.

DETAILED DESCRIPTION

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a further embodiment. Thus, it is intended that aspects of the present disclosure cover such modifications and variations.

The present disclosure generally relates to data management in a database system. More particularly, the present disclosure relates to leveraging temporarily-stored tables backed by an external memory storage system to enable low-latency data analytics and reporting.

The present disclosure provides examples of computing systems, computer-implemented methods, and computer programs stored in non-transitory, computer-readable media for leveraging temporarily-stored tables backed by an external memory storage system to enable low-latency data analytics and reporting.

In particular, both ephemeral memory (e.g., temporary or short-lived storage designed to be discarded after a specific period or purpose) in a Structured Query Language ("SQL") engine on a computing system and a connection to an external in-memory data store (e.g., a memory that stores data in random access memory (RAM)) can be used. Instead of relying solely on local, ephemeral memory on a single computing device or computing device cluster, stored data in the form of tables and metadata can be persisted on the external in-memory data store, effectively transforming the SQL engine on the computing system into an in-memory database system with querying ability through the SQL engine. This approach enables a shared, persistent state, in which multiple local computing clusters can point to the same external in-memory data store, making cached data in the external in-memory data store globally available.

This approach also allows the SQL engine to take data tables stored in ephemeral memory and provide expiration and/or eviction data to the tables, causing the data tables to automatically expire upon passage of a predetermined period of time or be evicted when a condition is met in ephemeral memory. This allows for data stored in ephemeral memory to be replaced as needed, preventing stale data accumulation in ephemeral memory and simplifying data table lifecycle management, reducing or eliminating the need for manual loading and unloading of data tables into ephemeral memory.

Finally, this approach allows the offloading of transient or intermediate data querying results from ephemeral memory to the external in-memory data store, which allows the SQL engine to maintain sub-three-second response times for interactive data analysis without storing the entirety of the required cached data in ephemeral memory.

Therefore, aspects of the present disclosure can facilitate efficient and highly parallelized reads and writes between a plurality of computing devices or clusters and one or more external in-memory data stores. To facilitate these reads and writes, the data tables stored in the external in-memory data store can be split into a plurality of chunks, or "pages," with each page being split into a plurality of blocks. This logical split of data tables allows each block to be mapped to a unique identification key, making retrieval and eviction of each block of data granular in nature. This allows the SQL engine to perform a read operation for just a subset of columns in a block referenced by a query, minimizing the amount of data that must be read within the external in-memory data store for each query to only the data in the blocks referenced by the query.

In some aspects of the present disclosure, administrators controlling the external in-memory data score can adjust the maximum number of pages or the total bytes per page, enabling fine-tuning for varying data table sizes stored in the external in-memory data store and allowing control of performance characteristics of read-write operations at the external in-memory data store to match performance requirements for certain operations. For example, if a particular user only requires a few read commands per day for data and does not require live reporting data (e.g., up to the second reporting data), it may be advantageous for administrators to define a larger page size and reduce the performance requirements. However, if a different user requires many reads per hour, it may be advantageous to reduce the page size to facilitate this higher number of reads. By logically separating the data and allowing these controls, this page-based approach can support parallel reads across multiple worker nodes (e.g., computing clusters or devices) and can avoid large network transfers for single, monolithic data objects.

In some aspects of the present disclosure, the computing clusters can use core data serialization classes of the computing cluster's existing memory to execute data reads. Reusing existing data serialization classes allows the computing cluster to seamlessly integrate the SQL engine with the external in-memory data store, ensuring that no special handling is required for the SQL engine to interface with external memory tables. Additionally, reusing the core data serialization classes allows the computing cluster to minimize overhead by storing blocks of data in a format already optimized for fast and efficient deserialization of data, especially in distributed queries.

In some aspects of the present disclosure, a two-level caching model can be employed by the computing clusters and the external in-data memory store. In a first tier, the external in-data memory store can persist all data in the system, which ensures that multiple computing clusters can access the data and, if a computing cluster requires a restart that removes any locally cached data, the computing cluster can immediately access previously-cached data from the external in-memory data store. In a second tier, frequently access blocks of data or recently accessed blocks of data can be cached locally on the computing cluster, reducing the amount of round-time read operations to and from the external in-memory data store. In some embodiments, different blocks of data stored in the external in-memory data store can be cached locally at different computing devices within a computing cluster for optimal cache utilization, further reducing the amount of read operations to the external in-memory data store. This tiered approach balances network overhead against the benefit of in-memory queries. Larger or more seldomly-access blocks of data can remain in the external in-memory data store, while recent or "hot" (e.g., frequently accessed) data can be cached locally for more efficient and quicker read operations.

In one aspect of the present disclosure, data tables can be treated by the external in-memory data store as ephemeral cache entries with one or more rules for how the data tables can be removed from ephemeral memory of the computing clusters. In one aspect, data tables can be given a time-to-live value, in which the data table automatically expires and is removed from ephemeral memory of the computing clusters after a defined period of time. In a different aspect, the external in-memory data store can handle eviction of lesser-used or the least-recently-used data tables if memory constraints are met, which allows memory space to be freed without manual intervention.

To optimize queries, the computing clusters can support pruning of data pages based on a sorted by column. At creation time in ephemeral memory of the computing cluster, the computing cluster can record minimum and maximum statistics for each data page in the ephemeral memory and the external in-memory data store, allowing the computing cluster to skip entire data pages during query planning if the data in the data page does noes match filter criteria of the query (e.g., a row_ID value between X and Y is not present in the data page).

The systems, methods, and computer program products described herein provide a number of technical effects and benefits. As one example, the embodiments described in the present disclosure The proposed invention provides for more efficient data reads between local computing clusters and external memory without sacrificing latency and efficiency. By reducing the need for long-running analytical queries to external memory, real-time or embedded dashboards used for data analytics can be dynamically or near-dynamically updated without high latencies for returning needed data. Frequent or repeated queries can result in the associated data being locally cached on computing clusters, further reducing latency, while automatically defining rules for how this cached data can be evicted or expired, reducing the need for manual caching and de-caching of data.

Because frequently-accessed data can be locally cached, the number of read calls needed to external memory can be reduced, minimizing the network bandwidth needed to handle repeated queries against the same datasets. Furthermore, through the logical division of data tables into pages and blocks at the external in-memory data store, read operations can be streamlined to not have to read all the data in a table, but rather only specific, relevant portions of the data in the external in-memory data store, which reduces the amount of processing needed at the external in-memory data store and reduces the networking bandwidth requirements needed to pass non-cached data to and from the computing clusters accessing the external in-memory data store. Additionally, the ability to cache frequently used data and then use one or more rules to de-cache that data at local computing clusters both efficiently uses memory at the computing clusters and also reduces the amount of memory needed at the computing clusters, as the connection to the external in-memory data store allows data to be persisted even after it is removed from the computing clusters. In this way, less memory can be used at the computing clusters.

With reference to the Figures, example embodiments of the present disclosure will be discussed in further detail.

FIG. 1 depicts a block diagram of an example plurality of computing systems 100 and 150 that performs operations according to example embodiments of the present disclosure. The plurality of computing systems 100 and 150 a first computing system 100, a second computing system 150, and an external in-memory data store 180.

The first computing system 100 can include one or more processors 105 and a local memory 110. The local memory 110 can include a SQL engine 113, an ephemeral memory cache 115 that includes data 120, and instructions 125. The second computing system can similarly include one or more processors 155 and a local memory 160. The local memory 160 can include a SQL engine 163, an ephemeral memory cache 165 that includes data 170, and instructions 175.

The plurality of computing systems 100 and 150 can be communicatively connected to the external in-memory data store 180 by a network. The network can include any type of communications network. For example, the network can include a local area network (LAN), a wide area network (WAN), an intranet, an extranet, and/or the internet. Further, the network 102 can include any number of wired or wireless connections and/or links that can be used to communicate with one or more computing systems (e.g., the computing systems 100 and 150 and/or the remote external in-data memory store 180) and/or one or more devices. Communication over the network can be performed via any type of wired and/or wireless connection and can use a wide variety of communication protocols (e.g., TCP/IP, HTTP, SMTP, FTP), encodings or formats (e.g., HTML, XML), and/or protection schemes (e.g., VPN, secure HTTP, SSL).

Each of the computing systems 100 and 150 can include any combination of systems and/or devices including one or more computing systems (not shown) and/or one or more computing devices. Further, the computing systems 100 and 150 may be connected (e.g., networked) to one or more other computing systems (e.g., the other computing system and/or the external in-memory data store 180) and/or one or more computing devices via the network. The computing systems 100 and 150 may operate in various different configurations including as a server or a client machine in a client-server network environment, or as a peer machine in a peer-to-peer (or distributed) network environment. Though the computing systems 100 and 150 are depicted in FIG. 1 as single devices, the computing systems 100 and 150 can include any collection or combination of devices that individually or in combination with other devices, execute a set of one or more instructions to perform any one or more of the operations discussed herein.

In this example, the computing systems 100 and 150 can include any type of computing device. For example, the computing systems 100 and 150 can include a personal computing device (e.g., a desktop computing device), a mobile computing device (e.g., a smartphone or tablet device), a wearable computing device (e.g., a smartwatch device), an embedded computing device, a web appliance, a server computing device, a network router, a switch, a bridge, or any device capable of executing a set of instructions (e.g., any combination of instructions which can include sequential instructions and/or parallel instructions) associated with one or more operations and/or one or more actions to be performed by the computing systems 100 and 150 or any of the constituent components and/or devices of the computing systems 100 and 150.

The one or more processors 105 and 155 can include any processing device (e.g., a processor core, a microprocessor, an ASIC, a FPGA, a controller, or a microcontroller) and can include one processor or multiple processors that may be operatively connected. In some embodiments, the one or more processors 114 may include one or more complex instruction set computing (CISC) microprocessors, one or more reduced instruction set computing (RISC) microprocessors, one or more very long instruction word (VLIW) microprocessors, and/or one or more processors that are configured to implement other instruction sets.

The computing systems 100 and 150 can include the local memory 110 and local memory 160. The local memory 110 and 160 can be used to store data and/or information and can include one or more computer-readable media, one or more non-transitory computer-readable storage media, and/or one or more machine-readable media. Though the local memory 110 and 160 are depicted in FIG. 1 as a single unit (e.g., a single medium), the computer-readable storage media can include a single medium or multiple media (e.g., a centralized or distributed database, and/or associated caches and servers) that store one or more sets of instructions. Further, the computer-readable storage media can include any medium that is capable of storing, encoding, and/or carrying a set of instructions for execution by a computing device and which may cause the computing device to perform any of the one or more operations described herein. In some embodiments, the computer-readable storage media can include one or more solid-state memories, one or more optical media, and/or one or more magnetic media. By way of example, the local memory 110 and 160 can include any combination of random-access memory (RAM), read-only memory (ROM), EEPROM, EPROM, one or more flash memory devices, and/or one or more magnetic storage devices (e.g., one or more hard disk drives).

The one or more processors 105 and 155 can be configured to execute one or more instructions to perform the operations described herein including, for example, one or more operations associated generating a report based on a user request. Further, the local memory 110 and 160 ca and/or the instructions 120, which can be executed by the one or more processors 114 to cause the one or more computing devices 112 to perform one or more operations. For example, the one or more operations performed by the one or more processors 114 can include receiving a request to generate a report, process the request, generate a query, and generate the report based on the query.

The data 120 and the data 170 can include organizational data (e.g., organizational data that can include one or more organizational records), one or more data structures defining, describing, and/or otherwise associated with the organizational data, rule data (e.g., one or more rules maintained by an organizational data management system), access rights data, application data (e.g., application data associated with a plurality of applications including one or more third-party applications and/or one or more intra-organizational applications), third-party integration data (e.g., data providing configuration and/or other information for performing integration and synchronization with each of one or more different third-party systems and/or applications), organizational policy data (e.g., organizational policy data associated with one or more organizational policies), application policy data (e.g., policy data that includes one or policies associated with the organizational data, the rule data, the application data, one or more applications, one or more devices), reporting data, and/or other types of data. Further, the instructions 125 and the instructions 175 can include one or more instructions to use data including the data 120 and the data 170 to perform any one or more of the various operations described herein. In some embodiments, the local memory 110 and 160 can be used to store one or more applications that can be operated by the one or more processors 105 and 155, such as real-time reporting applications.

The external in-memory data store 180 can include data blocks 185 that represent data tables of data for the organization associated with the external in-memory data store 180 and the plurality of computing systems 100 and 150. The external in-memory data store 180 can store organizational data, such as the organizational data described above. In some embodiments, the external in-memory data store 180 can be a data store that stores all data in RAM or other, similar type of volatile memory that allows for data items to be read or written irrespective of the physical location of the data inside the memory. By implementing this type of memory at the external in-memory data store 180, queries to the external in-memory data store 180 can still retain low latency data reads and writes, even over a network connection, as the point in the data transaction that would cause the most latency is the communication over the network connection, instead of waiting for more traditional memory stores to read or write data in addition to communicating over the network connection.

Figure 2:
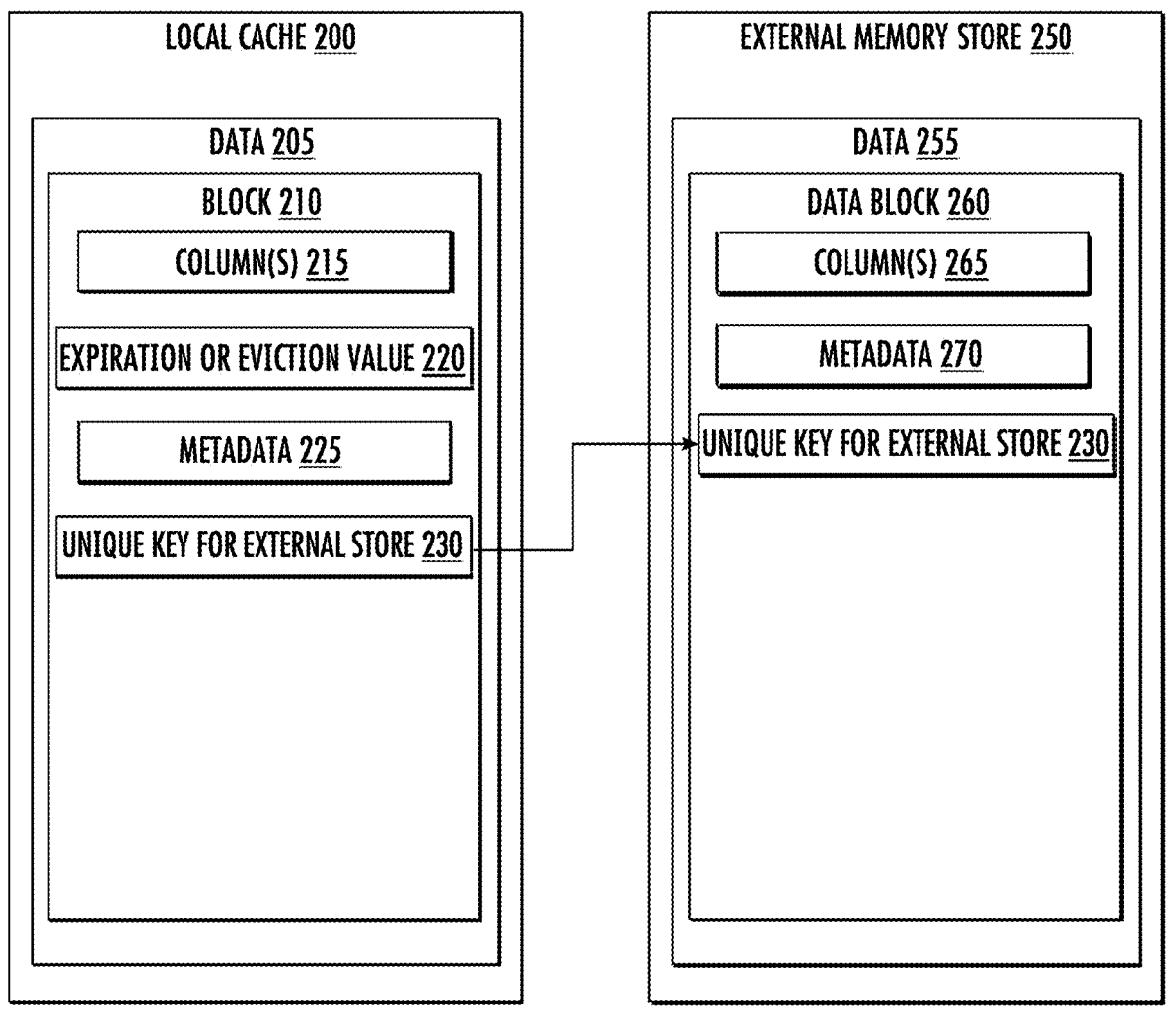
FIG. 2 is a block diagram illustrating communications between an ephemeral memory on a computing device and an external in-memory data store according to one aspect of the present invention.

FIG. 2 depicts a block diagram illustrating communications between an ephemeral memory 200 on a computing device, such as the plurality of computing systems 100 and 150, and an external in-memory data store 250 according to one aspect of the present invention.

The ephemeral memory 200 can be a local cache of memory residing in RAM or other volatile memory of a computing device or a computing system. By nature, ephemeral memory is temporary and short-lived, where data stored in the ephemeral memory exists only for a limited duration before being removed from the ephemeral memory 200. By leveraging the ephemeral memory 200, a computing device or computing system can maintain data for fast returns to queries for a limited duration and then can remove that data from the ephemeral memory 200 upon the end of a specified duration and/or one or more removal rules for the data being met. This allows the computing device or computing system to store relevant data for access for a duration, enabling quick reads and writes to the data for reporting purposes without storing all data locally and permanently on the computing device or computing system. This allows the computing device or computing system to maintain relatively low memory usage.

The ephemeral memory 200 can store data 205 as data blocks 210. The external in-memory data store 250 can store data 255 as data tables. Data tables can store data in a data structure, such as a range of cells, with each entry having shared attributes (e.g., a data item of "Office" having location, number of employees, and profits) with individual values for each attribute for each data item stored in the data table (e.g., the "Office" data item having a location of "San Francisco, CA," a number of employees "100," and profits "$1,000,000").

To expedite query searching and results, data tables can be split into chunks, or "pages," with each page representing a collection of data blocks, such as data blocks 210 and/or data blocks 260. These data blocks can be identified using identifying information, such as row numbers, column names, and the like. In some embodiments, pages or data blocks can be assigned a "sorted_by" column, which can record statistics about data reads and writes for each row in the page or data block, helping to delineate frequently-accessed pages or data blocks. Using this sorted_by column, entire pages or data blocks can be skipped during query processing time, reducing the amount of processing needed to identify data matching a query.

As noted above, the data blocks 210 and/or data blocks 260 can have one or more columns 215 and/or one or more columns 265. Each column can include a data value associated with the column heading, such as "Location," "Profits," and the like.

Each data block of the data blocks 210 can also have an expiration or eviction value 220. As described above, the ephemeral memory 200 is designed to only temporarily store frequently-accessed data for reporting. The expiration or eviction value 220 defines a duration and/or rules for the removal of data blocks 210 temporarily stored in the ephemeral memory 200. In some embodiments, data blocks 210 can be given only an expiration value or eviction value, while in other embodiments, data blocks 210 can be given both an expiration and eviction value.

In some embodiments, the expiration or eviction value 220 defines a duration of time for storing the data blocks 210. For example, the duration of time can be 24 hours, with the data block associated with the expiration or eviction value 220 being automatically removed from the ephemeral memory 200 after 24 hours has elapsed. This duration of time can be configurable by administrators, allowing for different data blocks 210 to have different durations of time associated with each data block. The data can persist in the ephemeral memory 200 for the duration of time and then be removed.

In some embodiments, the expiration or eviction value 220 can define a rule with one or more criteria for removal of data blocks 210. An example rule can be a "least recently used" rule, which can track when the data block was last accessed. The least recently used rule can determine that the data in the data block has not been accessed for a period of time, and based on this last access, can remove the data block from the ephemeral memory 200 if the data block has not been accessed for a period of time over a threshold value, such as 6 hours. In other embodiments, if a computing device attempts to load new data blocks into the ephemeral memory 200, the computing device can determine, based on metadata 225, which data blocks 210 have been least recently used for reporting. Based on the metadata 225, the least recently used data block can be removed from the ephemeral memory 200 and replaced with a new data block.

In another embodiment, the rule can be a "least frequently accessed" rule. In this case, if a computing device attempts to load new data blocks into the ephemeral memory 200, the computing device can determine, based on metadata 225, which data blocks 210 have been least frequently accessed for reporting. Based on the metadata 225, the least frequently accessed data block can be removed from the ephemeral memory 200 and replaced with a new data block.

In yet another embodiment, the rule can be a "manual cleanup" rule. For example, if a user wishes to remove one or more of the data blocks 210 from the ephemeral memory 200, the manual cleanup rule can identify particular commands to be received from the user that trigger removal of the data block from the ephemeral memory 200, such as a "DROP TABLE 'data block_ID'" command or other similar command.

In a further embodiment, the rule can include a "memory-constraint" criteria. If a data block to be stored in the ephemeral memory 200 would occupy more space than available in the ephemeral memory 200, the computing device can select a data block already stored in the ephemeral memory 200 to be removed based on other criteria, such as least recently used or least frequently accessed.

As noted above, metadata 225 can be used to track various statistics about data blocks 210, such as number of times accessed, time of last access, data block size, fraction of null values in the data block, a count of distinct values in the data block for a particular column, a low value in a column for the data block, a high value in a column for the data block, and the like. The computing device can make decisions about the storing of data in the ephemeral memory 200 based on the metadata 225.

Similarly, the external in-memory data store 250 can also store metadata 270 about each data block 255 stored in the external in-memory data store 250. Metadata 270 can include values such as number of times accessed, time of last access, data block size, fraction of null values in the data block, a count of distinct values in the data block for a particular column, a low value in a column for the data block, a high value in a column for the data block, and the like.

The data blocks 210 stored in the ephemeral memory 200 can also be mapped to the corresponding data blocks 255 stored in the external in-memory data store 250 using a unique key 230. This unique key references the data blocks 260 on the external in-memory data store 250 directly, allowing for data retrieval and data eviction to be granular in nature. Using the unique key 230, an optimal read of data from the external in-memory data store 250 for return and/or storage in the ephemeral memory 200 can be performed, allowing for only a desired subset of columns to be accessed by a query. This reduces the computational demand on both the computing device and the external in-memory data store 250, making queries faster and more precise.

The use of the unique key 230 also allows for multiple computing devices with ephemeral memory, such as the ephemeral memory 200, to access a singular external data store, such as the external in-memory data store 250. Computing devices can perform parallel reads on the same data blocks 260 using unique keys for the data blocks 260, and reading only the data blocks 260 identified by the unique key 230 can prevent large network transfers for single, monolithic data objects, such as full data tables.

The external in-memory data store 250 can initially persist all data for an organization. This allows the external in-memory data store 250 to be a single data repository for a plurality of computing devices associated with the organization. This allows for computing device restarts and multiple-device access to the data stored in the external in-memory data store 250 while maintaining data integrity.

In contrast, when data blocks 260 are accessed by computing devices, frequently accessed data blocks can be cached locally in the ephemeral memory 200 of the computing device to reduce round-trip queries to the external in-memory data store 250. In some embodiments, a SQL engine or coordinator module (described below with regards to FIG. 3) can distribute data blocks across a plurality of computing devices to optimize cache utilization and further decrease the amount of queries that must be run against the data 255 stored in the external in-memory data store 250.

Figure 3:
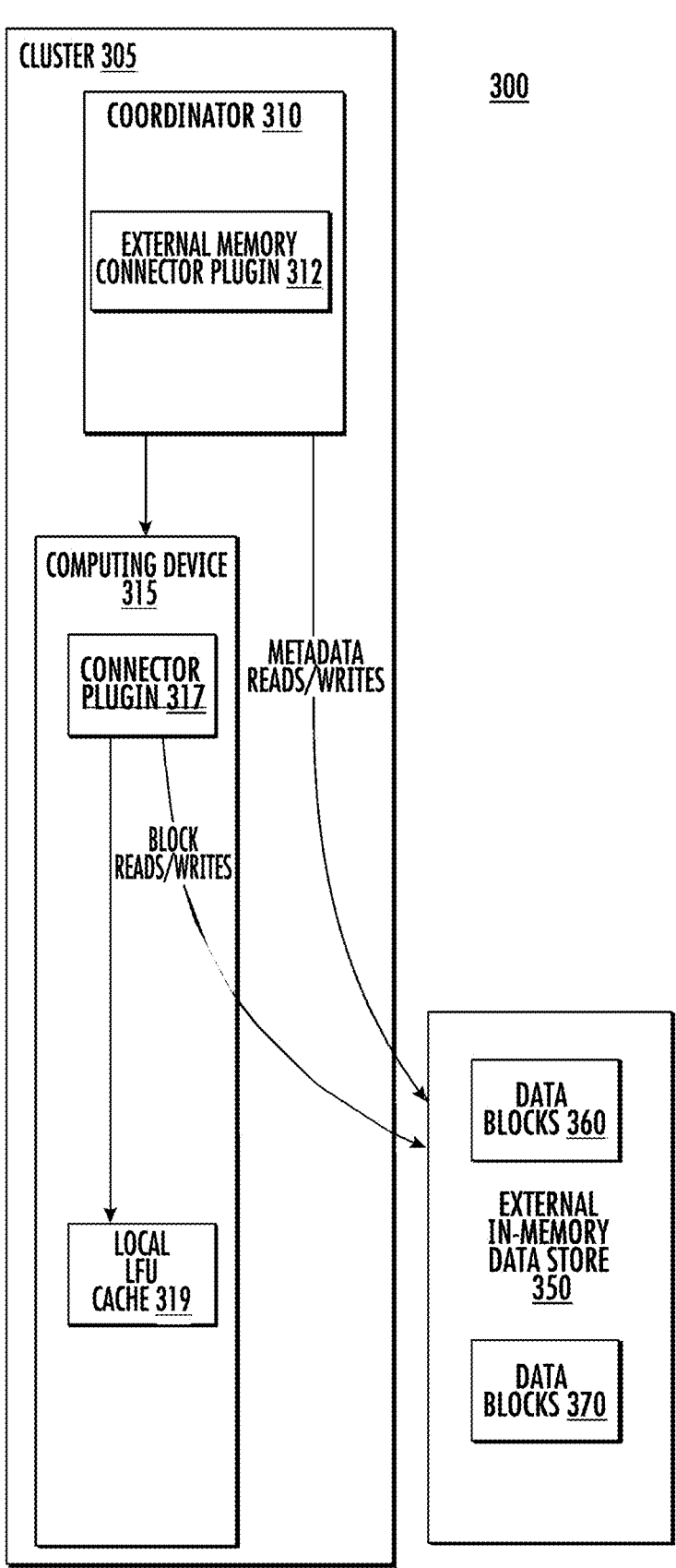
FIG. 3 is a block diagram of an environment for returning query results according to example embodiments of the present disclosure.

FIG. 3 depicts a block diagram of an environment 300 for returning query results according to example embodiments of the present disclosure.

In some embodiments, the environment 300 can include a computing device cluster 305, which can include a coordinator node 310 and one or more computing devices 315. The environment 300 can also include an external in-memory data store 350, which can store data blocks 360 and 370.

The computing device cluster 305 can include a plurality of computing devices, such as the one or more computing devices 315. Each of the computing devices can perform various functions, such as performing data reporting, for users associated with the organization. The computing device cluster 305 can also have the coordinator module 310, or coordinator node, that can manage queries across the computing device cluster 305. For example, the coordinator module 310 can receive queries from the one or more computing devices 315, process the queries, and generate SQL queries using a SQL engine to retrieve data stored in ephemeral memories 319 of the one or more computing devices and/or utilize an external memory connector plug-in 312 to retrieve data from the external in-memory data store 350. In some embodiments, the external memory connector plug-in 312 can perform metadata reads and writes for cached data stored in the ephemeral memories 319 of the one or more computing devices 315 to identify the most and least frequently accessed data blocks stored both in the ephemeral memories 319 and the external in-memory data store 350.

Each of the one or more computing devices 315 can include a connector plug-in 317. The connector plug-in 317 can allow for the one or more computing devices 315 to perform data block reads and writes between the one or more computing devices 315 and the external in-memory data store 350. The connector plug-in 317 can, for example, perform data serialization to match data block format between the data stored in the ephemeral memories 319 and the data blocks 360 and 370. This allows the one or more computing devices 315 to integrate into the coordinator module 305 and the external in-memory data store 350, ensuring that no specialized handling is required for reading and writing the data blocks 360 and 370. Additionally, the connector plug-in 317 can also minimize computational overhead at the one or more computing devices 315 by formatting and storing data in the ephemeral memories 319 in a format similar to the external in-memory data store 350, which can already be optimized for fast serialization and deserialization of data, especially in distributed queries.

Figure 4:
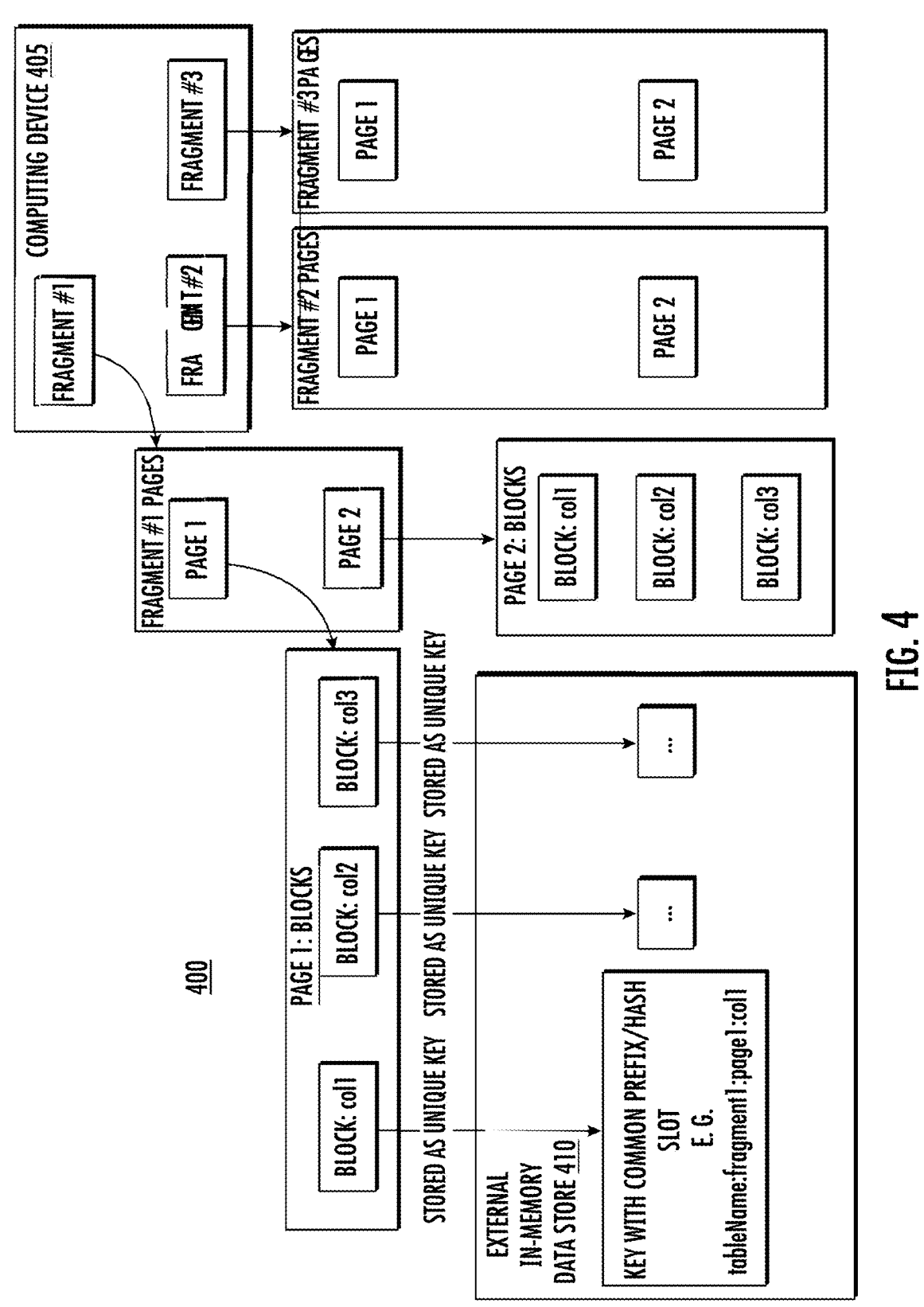
FIG. 4 is a block diagram illustrating a data paging environment according to aspects of the present disclosure.

FIG. 4 depicts a block diagram illustrating a data paging environment 400 according to aspects of the present disclosure. The data paging environment 400 can include a computing device 405 that can store one or more data fragments in an ephemeral memory of the computing device 405. The data paging environment 400 can also include an external in-memory data store 410 that can store data blocks along with unique keys for each data block.

As shown, the computing device 405 can store data fragments, which are in turn made up of data pages. Each data page can be made up of one or more data blocks, which can have columns associated with each data block. These columns can be associated with columns stored in data blocks on the external in-memory data store 410 using a unique key. This unique key allows the computing device 405 to quickly identify columns in the external in-memory data store 410 that match a query, allowing the computing device 405 to skip data blocks irrelevant to the query.

Figure 5:
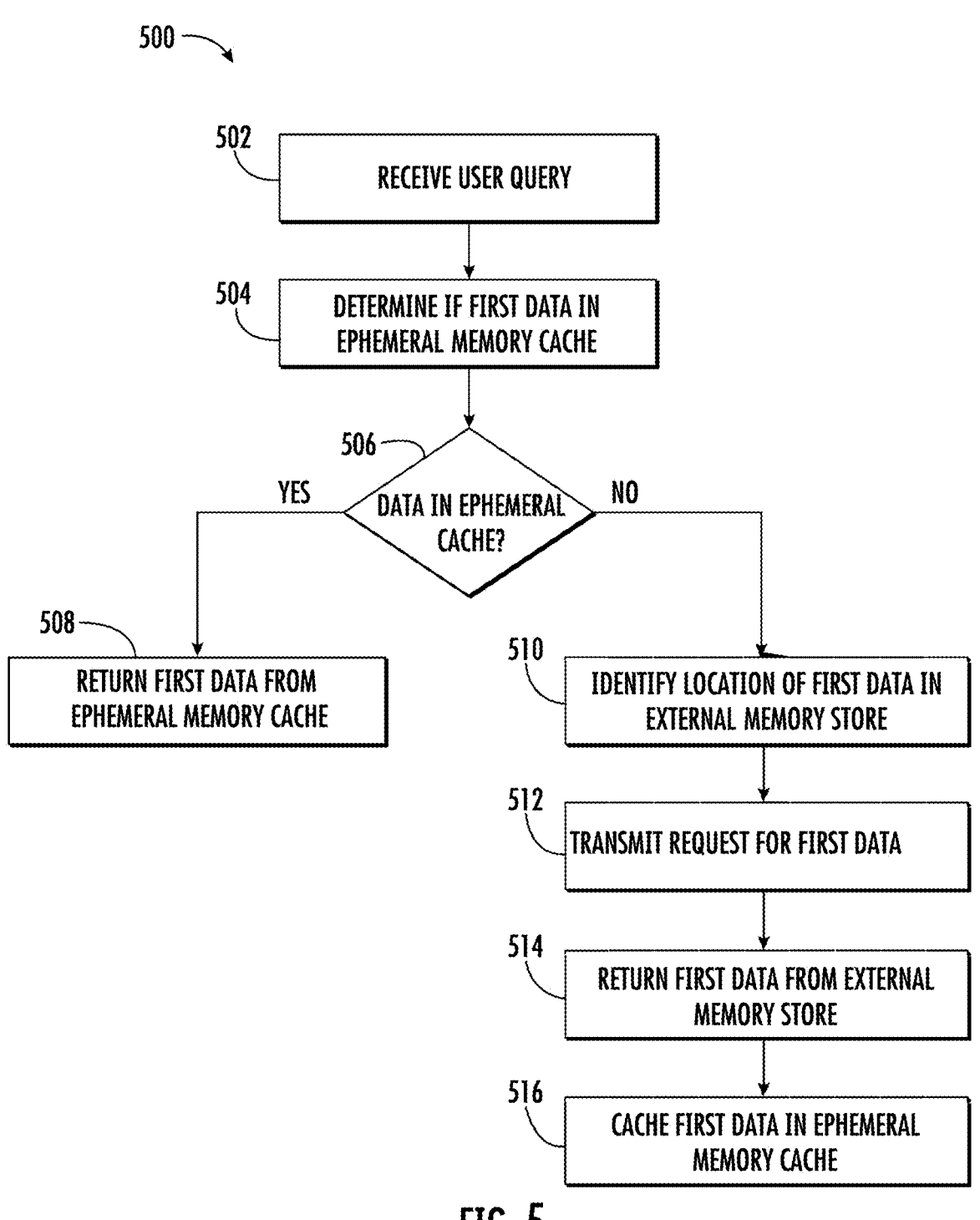
FIG. 5 is a flow chart illustrating a method for returning data in response to a user query according to one aspect of the present invention.

FIG. 5 depicts a flow diagram of an example method 500 for returning data in response to a user query according to one aspect of the present invention. One or more portions of the method 500 can be executed and/or implemented on one or more computing devices or computing systems including, for example, the plurality of computing systems 100 and 150 and the external in-memory data store 180. In addition, one or more portions of the method 500 can be executed or implemented as an algorithm on the hardware devices or systems disclosed herein. FIG. 5 depicts steps performed in a particular order for purposes of illustration and discussion. As such, those of ordinary skill in the art, using the disclosures provided herein, will understand that various steps of any of the methods disclosed herein can be adapted, modified, rearranged, omitted, and/or expanded without deviating from the scope of the present disclosure.

According to some embodiments, a computer system can automatically generate an output (e.g., report, chart) based on organizational data of an organization. The computer system can include one or more processors and one or more databases.

At 502, a computer system can receive a user query, the user query identifying first data as a query result For example, a user can create a query that requests "Sales data from the San Francisco Office for the last year." The computer system can utilize, for example, a SQL engine to generate a SQL query for the relevant data based on a data identifier that identifies the first data, such as a column heading or name.

At 504, the computer system can determine if the first data is stored in an ephemeral memory of the computer system. For example, based on the data identifier, the computer system can determine if a data block stored in the ephemeral memory includes the first data.

If the ephemeral memory of the computer system contains the first data as the query result (Y es at block 506), the computer system can return the identified data from the ephemeral memory (block 508). In some embodiments, the computer system can pass the identified data to a reporting application, which can process the identified data to generate a report based on the identified data, such as a graph, a chart, and the like.

If the ephemeral memory of the computer system does not contain the first data as the query result (No at block 506), the computer system can identify the location of the first data in an external in-memory data store (block 510). In one example, to identify the location of the first data in the external in-memory data store, the computer system can use the data identifier as a unique key that indicates the location of the first data. The external in-data memory store can data tables as a collection of data blocks, and the data block identifier associated with the first data cached in the ephemeral memory portion of the local memory can a unique key mapping to a data block of the collection of data blocks stored in the external in-data memory store.

At block 512, the computer system can transmit a request for the identified data to the external in-memory data store. In one example, this request can be a SQL query formatted to a data format of the external in-memory data store and can include the data identifier for processing by the external in-memory data store. The computer system can then receive the identified data from the external in-memory data store.

At block 514, the computer system can return the identified data received from the external in-memory data store as the query result. In some embodiments, the computer system can pass the identified data to a reporting application, which can process the identified data to generate a report based on the identified data, such as a graph, a chart, and the like.

At block 516, the computer system can cache the identified data in the ephemeral memory of the computer system for later retrieval. In some embodiments, the cached data can be given a time-to-live value, such as an expiration value or an eviction value, that provides a duration of time and/or one or more rules criteria for when the cached data should be removed from the ephemeral memory.

In some embodiments, the time-to-live value can be an expiration value defining a time period, and the first data can be removed from the ephemeral memory upon the time period elapsing.

In some embodiments, the time-to-live value can be an eviction value defining at least one eviction rule for the first data. The first data can be removed from the ephemeral memory upon one or more criteria for the eviction rule being met.

In some embodiments, the one or more criteria for the eviction rule can include least-recently used data criteria. If the data block has been the least-recently used of all cached data blocks, the data block can be removed.

In some embodiments, the one or more criteria for the eviction rule can include a memory constraint criteria. If a new data block is to be cached, the memory constraint criteria can indicate that a largest data block in the ephemeral memory is to be removed.

In some embodiments, caching the identified data can include identifying, based on one or more metadata values associated with data stored in the external in-memory data store, one or more data blocks to cache in the ephemeral memory portion of the local memory. For example, frequently accessed data blocks (as defined by metadata stored in the external in-memory data store) can be identified as useful data blocks to cache to reduce round trips between the computer system and the external in-memory data store. The computer system can then cache the identified one or more blocks in the ephemeral memory with a time-to-live value.

Figure 6:
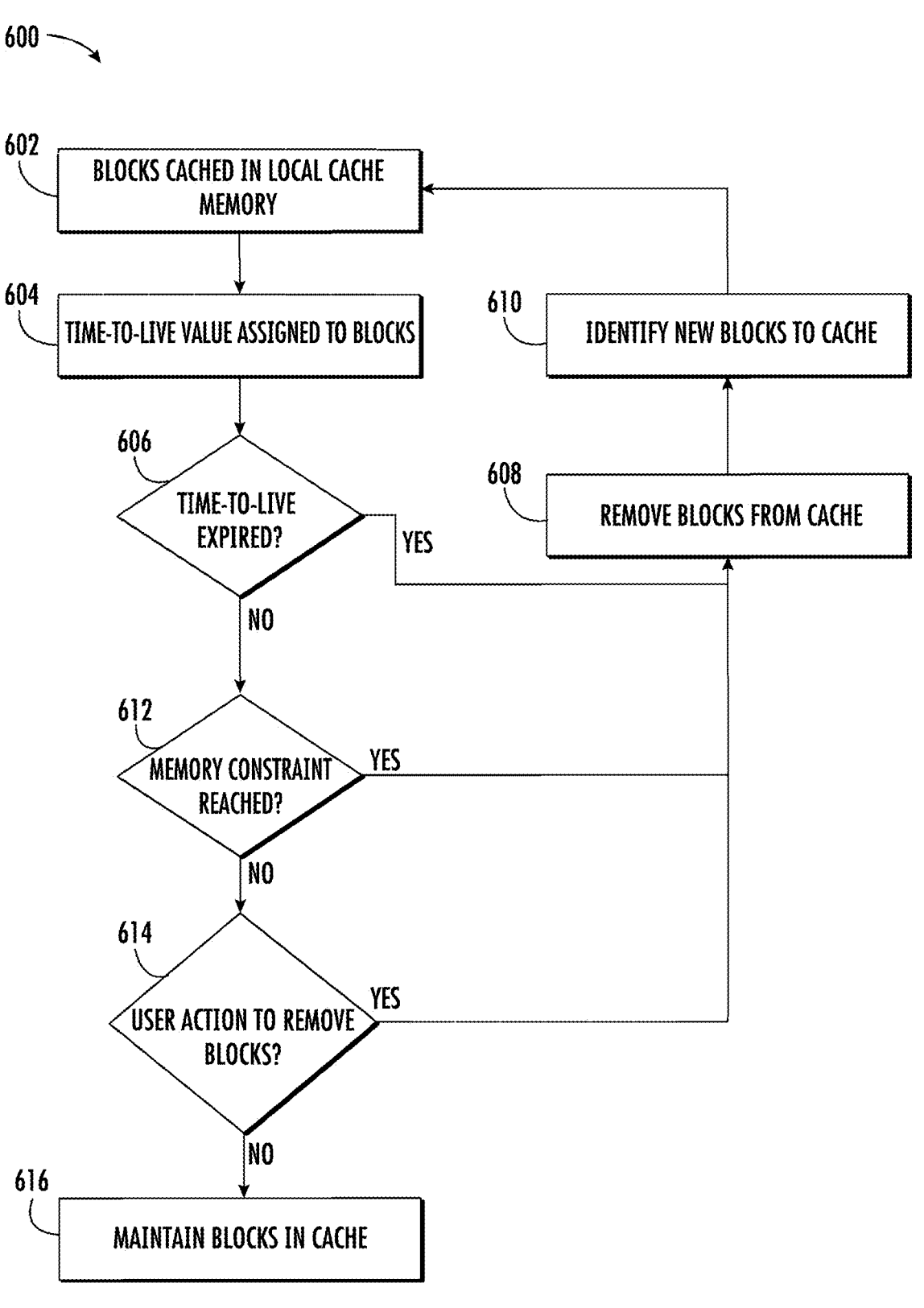
FIG. 6 is a flow chart illustrating a method for de-caching data in an ephemeral data portion of local memory of a computing device according to one aspect of the present invention.

FIG. 6 depicts a flow diagram of an example method 600 for de-caching data in an ephemeral data portion of local memory of a computing device according to one aspect of the present invention. One or more portions of the method 600 can be executed and/or implemented on one or more computing devices or computing systems including, for example, the plurality of computing systems 100 and 150 and the external in-memory data store 180. In addition, one or more portions of the method 600 can be executed or implemented as an algorithm on the hardware devices or systems disclosed herein. FIG. 6 depicts steps performed in a particular order for purposes of illustration and discussion. As such, those of ordinary skill in the art, using the disclosures provided herein, will understand that various steps of any of the methods disclosed herein can be adapted, modified, rearranged, omitted, and/or expanded without deviating from the scope of the present disclosure.

At block 602, a computer system can cache one or more data blocks from an external in-memory data store in a local ephemeral memory of the computer system.

At block 604, the computer system can assign a time-to-live value to each of the cached data blocks. The time-to-live value can be an expiration or eviction value that indicates when the cached data blocks are to be removed from the ephemeral memory of the computer system. An expiration value can define a duration of time in which the data blocks should be persisted in the ephemeral memory and, upon completion of that duration of time, can cause removal of the cached data blocks. An eviction value can define one or more rules with criteria that, upon meeting of the criteria, cause the removal of the cached data blocks.

At block 606, the computer system can determine if the time-to-live value has expired. In one example, if the time-to-live value is an expiration value, the computer system can determine if the duration of time defined by the expiration value has been met. In another example, if a data block has not been accessed If so (Y es at block 606), the computer system can remove the blocks from the cache (block 608).

At block 610, the computer system can identify new data blocks to cache from an external in-memory data store. In one example, frequently accessed data (defined by metadata stored in the external in-memory data store) can be identified as useful data blocks to cache, and the computer system can cache these data blocks in the ephemeral memory (block 602).

If the time-to-live value has not expired (No at block 606), the computer system can then move to block 612.

At block 612, the computer system can determine if a memory constraint has been reached. As the computer system attempts to cache new blocks, it is advantageous to control the amount of data being cached in ephemeral memory so as to maintain quick query response performance. If a memory constraint of the ephemeral memory is reached (Y es at block 612), one or more data blocks can be removed from the ephemeral memory based on one or more criteria, such as a least-frequently accessed block being removed, a least-recently accessed block being removed, a largest block being removed, and the like. The identified block(s) can be removed from the cache (block 608) and the newly identified block being cached (block 610) can then be cached in the ephemeral memory (block 602).

If a memory constraint has not been reached (No at block 612), the computer system can then determine if a user has taken an action to remove one or more identified data blocks manually from the ephemeral memory (block 614). For example, if a user wishes to de-cache a block, the user can enter a command such as "DROP TABLE (BLOCK_ID)" or a similar command. If the user has entered this command (Y es at block 614), the identified blocks can be removed from the ephemeral memory (block 608) and new blocks can be identified (block 610). The newly identified blocks can then be cached in the ephemeral memory (block 602).

If a user has not taken an action to remove data blocks (No at block 614), the computer system can maintain the cached data blocks (block 616) and repeat this process.

Numerous details are set forth in the foregoing description. However, it will be apparent to one of ordinary skills in the art having the benefit of this disclosure that the present disclosure may be practiced without these specific details. In some instances, structures and devices are shown in block diagram form, rather than in detail, to avoid obscuring the present disclosure.

Some portions of the detailed description have been presented in terms of processes and symbolic representations of operations on data bits within a computer memory. Here, a process can include a self-consistent sequence of steps leading to a result. The steps can include those requiring physical manipulations of physical quantities. These quantities can take the form of electrical or magnetic signals capable of being stored, transferred, combined, compared, and otherwise manipulated. These signals can be referred to as bits, values, elements, symbols, characters, terms, numbers, or the like.

These terms and similar terms can be associated with physical quantities and can represent labels applied to these quantities. The terms including "obtaining," "parsing," "analyzing," "accessing," "determining," "identifying," "adjusting," "modifying," "transmitting," "receiving," "processing" "generating," or the like, can refer to the actions and processes of a computer system, a computing device, or similar electronic computing device, that manipulates and transforms data represented as physical (e.g., electronic) quantities within the computer system's registers and memories into other data that can be similarly represented as physical quantities within the computer system's memories, registers, or other information storage device, data transmission device, or data processing device.

Certain examples of the present disclosure can relate to an apparatus for performing the operations described herein. This apparatus may include a computing device that is activated or reconfigured by a computer program comprising electronic instructions stored in the computing device. Such a computer program may be stored in a computer readable storage medium, which can include any type of storage. For example, the storage can include hard disk drives, solid state drives, floppy disks, optical disks, CD-ROMs, and magnetic-optical disks, read-only memories (ROM s), random access memories (RAM s), EPROMS, EEPROMs, magnetic or optical cards, or any type of media suitable for storing electronic instructions.

The above description is intended to be illustrative, and not restrictive. The scope of the disclosure can therefore be determined with reference to the claims.

The technology discussed herein makes reference to servers, databases, software applications, and other computer-based systems, as well as actions taken, and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure covers such alterations, variations, and equivalents.

What is claimed is:

1. A computing system, comprising:

one or more processors;

a local memory, the local memory comprising an ephemeral memory portion and instructions that, when executed by the one or more processors, cause the one or more processors to perform operations, the operations comprising:

receiving a user query, the user query identifying first data as a query result;

identifying which of the ephemeral memory portion of the local memory or an external in-memory data store stores the first data;

if the first data is stored in the ephemeral memory portion of the local memory:

returning the first data from the ephemeral memory portion of the local memory as the query result; and if the first data is stored in the external in-memory data store:

transmitting a request to the external in-memory data store, the request identifying the first data in the external in-memory data store using a data block identifier associated with the first data;

receiving the first data from the external in-memory data store;

returning the first data as the query result; and caching the first data in the ephemeral memory portion of the local memory with a time-to-live value.

2. The computing system of claim 1, wherein the time-to-live value is an expiration value defining a time period, and wherein the first data is removed from the ephemeral memory portion of the local memory upon the time period elapsing.

3. The computing system of claim 1, wherein the time-to-live value is an eviction value defining at least one eviction rule for the first data, and wherein the first data is removed from the ephemeral memory portion of the local memory upon one or more criteria for the eviction rule being met.

4. The computing system of claim 3, wherein the one or more criteria for the eviction rule comprises a least-recently used data criteria.

5. The computing system of claim 3, wherein the one or more criteria for the eviction rule comprises a memory constraint criteria.

6. The computing system of claim 1, wherein the external in-data memory store stores data tables as a collection of data blocks, and wherein the data block identifier associated with the first data cached in the ephemeral memory portion of the local memory is a unique key mapping to a data block of the collection of data blocks stored in the external in-data memory store.

7. The computing system of claim 1, wherein caching the first data in the ephemeral memory portion further comprises:

identifying, based on one or more metadata values associated with data stored in the external in-memory data store, one or more data blocks to cache in the ephemeral memory portion of the local memory; and caching the identified one or more blocks in the ephemeral memory portion of the local memory with a time-to-live value.

8. A computer-implemented method, comprising:

receiving, by one or more processors of a computing system, a user query, the user query identifying first data as a query result;

identifying, by the one or more processors, which of the ephemeral memory portion of the local memory of the computing system or an external in-memory data store stores the first data;

if the first data is stored in the ephemeral memory portion of the local memory:

returning, by the one or more processors, the first data from the ephemeral memory portion of the local memory as the query result; and if the first data is stored in the external in-memory data store:

transmitting, by the one or more processors, a request to the external in-memory data store, the request identifying the first data in the external in-memory data store using a data block identifier associated with the first data;

receiving, by the one or more processors, the first data from the external in-memory data store;

returning, by the one or more processors, the first data as the query result; and caching, by the one or more processors, the first data in the ephemeral memory portion of the local memory with a time-to-live value.

9. The computer-implemented method of claim 8, wherein the time-to-live value is an expiration value defining a time period, and wherein the first data is removed from the ephemeral memory portion of the local memory upon the time period elapsing.

10. The computer-implemented method of claim 8, wherein the time-to-live value is an eviction value defining at least one eviction rule for the first data, and wherein the first data is removed from the ephemeral memory portion of the local memory upon one or more criteria for the eviction rule being met.

11. The computer-implemented method of claim 10, wherein the one or more criteria for the eviction rule comprises a least-recently used data criteria.

12. The computer-implemented method of claim 10, wherein the one or more criteria for the eviction rule comprises a memory constraint criteria.

13. The computer-implemented method of claim 8, wherein the external in-data memory store stores data tables as a collection of data blocks, and wherein the data block identifier associated with the first data cached in the ephemeral memory portion of the local memory is a unique key mapping to a data block of the collection of data blocks stored in the external in-data memory store.

14. The computer-implemented method of claim 8, wherein caching the first data in the ephemeral memory portion further comprises:

identifying, by the one or more processors and based on one or more metadata values associated with data stored in the external in-memory data store, one or more data blocks to cache in the ephemeral memory portion of the local memory; and caching, by the one or more processors, the identified one or more blocks in the ephemeral memory portion of the local memory with a time-to-live value.

15. A non-transitory, computer-readable medium comprising:

an ephemeral memory portion of a local memory; and instructions that, when executed by one or more processors, cause the one or more processors to perform operations, the operations comprising:

receiving a user query, the user query identifying first data as a query result;

identifying which of the ephemeral memory portion of the local memory or an external in-memory data store stores the first data;

if the first data is stored in the ephemeral memory portion of the local memory:

returning the first data from the ephemeral memory portion of the local memory as the query result; and if the first data is stored in the external in-memory data store:

transmitting a request to the external in-memory data store, the request identifying the first data in the external in-memory data store using a data block identifier associated with the first data;

receiving the first data from the external in-memory data store;

returning the first data as the query result; and caching the first data in the ephemeral memory portion of the local memory with a time-to-live value.

16. The non-transitory, computer-readable medium of claim 15, wherein the time-to-live value is an expiration value defining a time period, and wherein the first data is removed from the ephemeral memory portion of the local memory upon the time period elapsing.

17. The non-transitory, computer-readable medium of claim 15, wherein the time-to-live value is an eviction value defining at least one eviction rule for the first data, and wherein the first data is removed from the ephemeral memory portion of the local memory upon one or more criteria for the eviction rule being met.

18. The non-transitory, computer-readable medium of claim 17, wherein the one or more criteria for the eviction rule comprises a least-recently used data criteria.

19. The non-transitory, computer-readable medium of claim 17, wherein the one or more criteria for the eviction rule comprises a memory constraint criteria.

20. The non-transitory, computer-readable medium of claim 15, wherein the external in-data memory store stores data tables as a collection of data blocks, and wherein the data block identifier associated with the first data cached in the ephemeral memory portion of the local memory is a unique key mapping to a data block of the collection of data blocks stored in the external in-data memory store.

* * * * *